United States Patent [19]
Vanderwerf

[11] Patent Number: 4,719,547
[45] Date of Patent: Jan. 12, 1988

[54] ILLUMINATION SYSTEM FOR OVERHEAD PROJECTOR

[75] Inventor: Dennis F. Vanderwerf, Cottage Grove, Minn.

[73] Assignee: Minnesota Mining and Manufacturing Company, St. Paul, Minn.

[21] Appl. No.: 909,510

[22] Filed: Sep. 19, 1986

[51] Int. Cl.$^4$ .............................................. F21V 7/00
[52] U.S. Cl. ...................................... 362/299; 353/64; 362/328
[58] Field of Search .................... 353/63, 64; 362/299, 362/327, 328

[56] References Cited

U.S. PATENT DOCUMENTS 3,486,817 12/1969 Hubner ............................ 353/64 X

FOREIGN PATENT DOCUMENTS 96931 7/1980 Japan ..................................... 353/63
185395 4/1923 United Kingdom .................. 353/63

Primary Examiner—Stephen F. Husar
Attorney, Agent, or Firm—Donald M. Sell; James A. Smith; David W. Anderson

[57] ABSTRACT

An illumination system for use in an overhead projector which includes a tungsten filament light source, a back concave reflector, and a plano-convex glass condenser. The position of the light source relative to the concave reflector is controlled to give a specific longitudinal separation of the light source filament and its magnified image which results in a radiation parallax which produces improved efficiency, illumination and light uniformity at the projected image of the overhead projector.

6 Claims, 7 Drawing Figures

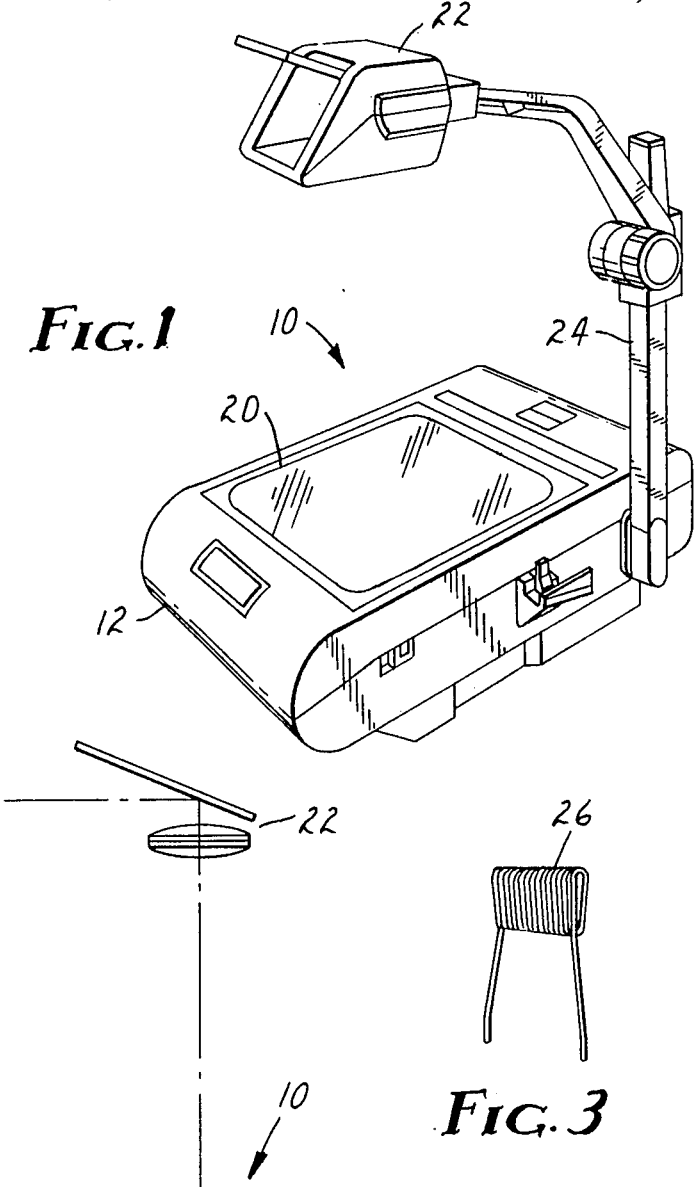
FIG. 1
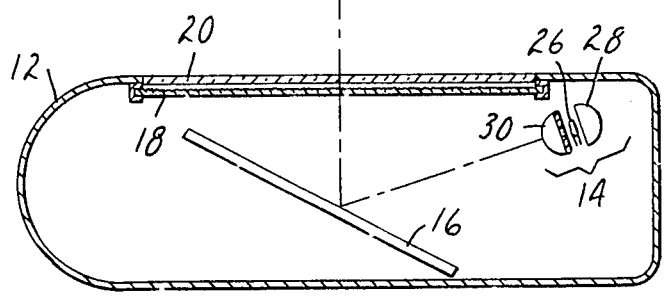
FIG. 3
FIG. 2

ILLUMINATION SYSTEM FOR OVERHEAD PROJECTOR

BACKGROUND OF THE INVENTION

1. Field of the Invention

The present invention relates to overhead projectors and, in particular, illumination systems for use in such projectors.

2. Description of the Prior Art

Typical overhead projectors comprise a box-like case containing an illumination system beneath a Fresnel condensing lens, an adjacent stage for supporting a transparency, and a projection head adjustably mounted above the stage for directing and focusing the projected image. The illumination system includes optics and a light source, usually a tungsten filament lamp. The optics collect as much light as possible from the light source and distribute this light over the Fresnel lens.

In order to utilize the light emitted from the backside of the light source filament a concave reflector is often placed behind the lamp filament. In the most common configuration, the reflector is spherical and is positioned such that the lamp filament is at the reflector's center of curvature, thus producing an inverted image of the lamp filament at unit magnification and at the same focal plane as the lamp filament. When the tungsten filament is constructed in an open or loosely wound fashion, the position of the reflected image is usually adjusted laterally to fill in gaps in the filament structure, and thus prevent obstruction of the reflected filament image by the actual filament. A description of this construction is found in *Engineering Optics*, Habel and Cox, Pitman Publishing, 1971, pp. 251–252. If the tungsten filament is of a closed or tightly wound construction, the filament image is laterally shifted to one side of the actual filament, again to prevent obstruction of the reflected filament image by the actual filament. A discussion of this construction may be found in *Optics and Optical Instruments*, Johnson, Dover Publications, Inc., 1960, page 141. In both cases, screen illumination is increased by use of the concave reflector.

U.S. Pat. No. 3,979,160, assigned to the assignee of the present invention, describes an improved illumination system which achieves improved lighting efficiency and uniformity by the use of an ellipsoidal reflector and a de-focused light source. The filament image is longitudinally separated from the actual filament to such a degree that the filament image becomes the only effective source of light. It is claimed that with this illumination system 2,000 screen lumens can be achieved with a 360 watt lamp.

SUMMARY OF THE INVENTION

The present invention provides an illumination system which achieves an efficiency increase such that it is possible to achieve over 2000 screen lumens with a 275 watt lamp. The illumination is also increased significantly near the edges and corners of the screen, yielding improved corner-to-center ratios over previous overhead projectors.

Such an increase in efficiency and uniformity is achieved by providing a glass condenser lens, a closely-wound tungsten filament light source, and a spherically concave reflector. The reflector is positioned relative to the light source filament such that the filament is imaged on-axis in the region between the actual filament and the condenser lens. This controlled longitudinal separation of the reflector focal planes causes a parallax condition to occur between the filament and its image. This parallax condition gives increasing lateral separation between the filament and its image as the off-axis angle of radiation is increased. By control of this parallax, the filament image goes from near obscurity on-axis to complete visibility at the maximum usable radiation angle of the system. At the maximum radiation angle, the filament and its image appears as a single light source which contributes more light to the outer parts of the screen, resulting in the improved efficiency and uniformity previously stated.

BRIEF DESCRIPTION OF THE DRAWINGS

The present invention will be more thoroughly described with reference to the accompanying drawings, wherein like numbers refer to like parts in the several views, and wherein:

FIG. 1 is a perspective view of an overhead projector embodying the improved illumination system of the present invention;

FIG. 2 is a cross-sectional, elevational view of the overhead projector of FIG. 1;

FIG. 3 is a perspective view of a tungsten filament preferably used in the present invention;

DESCRIPTION OF THE PREFERRED EMBODIMENT

Figure 4:
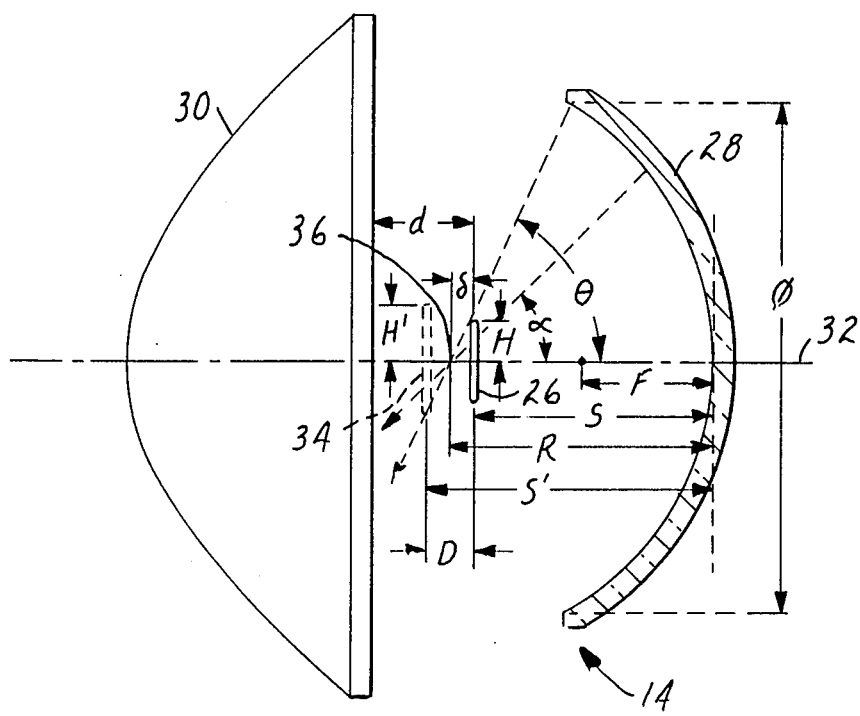
FIG. 4 is a cross-sectional view of the illumination system.

An overhead projector embodying the present invention is illustrated in FIGS. 1 and 2 and is generally indicated by the number 10. The projector 10 includes a base 12, which encloses an illumination system 14, a plane mirror 16 and a Fresnel lens 18. The overhead projector's base 12 supports a transparent stage 20 and a projection head 22 by means of a support arm 24. The transparent stage 20 supports a transparency (not shown).

The projector 10 produces a magnified image of this transparency on a remote vertical surface or screen (not shown) by means of light which is generated by the illumination system 14, reflected by the plane mirror 16, condensed by the Fresnel lens 18 and directed to the screen by the projection head 22. It is desirable in such an overhead projector 10 to provide an illumination system which produces as much usable light at the screen as possible and which distributes this light over the entire surface of the transparency. The subject of the present invention is the illumination system 14 which is schematically illustrated in greater detail in FIG. 4.

The illumination system 14 includes a light source 26, a concave reflector 28 and a condenser lens 30. The light source 26 is a tungsten filament which is suitably and customarily enclosed in an evacuated glass bulb (not shown). The filament is preferably of the closed or tightly wound construction, as illustrated in FIG. 3, which is designated by the American National Standards Institute (ANSI) as an FNT type lamp. Although such a filament 26 is preferred, filaments of the open or loosely wound type may be used.

The filament 26 is positioned along the optical axis 32 of the illumination system 14 such that a slightly magnified image 34 of the filament 26 is formed between the filament 26 and the condenser lens 30. The filament image 34 is illustrated in FIG. 4 by phantom lines. To form a filament image 34 with minimum spherical aberration, the curvature of the concave reflector 28 should be ellipsoidal. However, because of the small longitudinal separation between the filament 26 and its image 34, the curvature can be approximated by a less expensive and more easily obtainable spherical reflector 28. The reflector 28 is of conventional construction and includes a "cold mirror dielectric coating" which reflects visible light and transmits the nearer infrared to reduce the reflected heat load on the filament 26.

The condenser lens 30 is preferably glass to withstand the heat generated by the filament 26 and is also preferably plano-convex (as shown in FIG. 4) or concave-convex and is designed to redirect the light produced by the filament 26 to just cover the Fresnel lens 18 adjacent the stage 20. Thus all light impinging on the Fresnel lens 18 can be effectively utilized to illuminate the transparency and project an image of that transparency through the projection head 22 and onto the screen.

To use a spherical concave reflector 28, as is desired, it is necessary to position the filament 26 a specified distance inside the center of curvature 36 of the reflector 28. The mathematical relationships which describe this positioning of the filament 26 are given below, with the letters and symbols corresponding to those shown in FIG. 4:

$$R = 2F \tag{1}$$

$$S' = FS/(S-F) \tag{2}$$

$$M = S'/S = H'/H \tag{3}$$

$$D = S' - S = (H' + H)/\tan(\theta) \tag{4}$$

$$\delta = R - S \tag{5}$$

where:
F = Reflector focal length
R = Reflector radius of curvature
S = Filament distance from reflector vertex
S' = Filament image distance from reflector vertex
H = Filament half-diagonal height
H' = Filament image half-diagonal height
M = Filament image magnification
D = Separation of filament and filament image
$\theta$ = Reflector rim angle
$\phi$ = Reflector aperture
$\alpha$ = Radiation angle of light source
$\delta$ = Separation of filament and reflector center of curvature
d = Separation of filament and glass condenser For radiation that is emitted in the reflection of the reflector rim angle, $\theta$, the required longitudinal separation, $\delta$, is simply given by:

$$\delta = H/\tan(\theta) \tag{6}$$

Satisfaction of the equation (6) ensures that at the reflector rim angle, $\theta$, for light emitted in the direction of the reflector 28 radius of curvature, R, the top of the actual filament 26 appears to touch the bottom of the filament image 34. In practice, the distance of the lamp filament 26 from the filament image 34 is on the order of four millimeters.

The improvements achieved by the specified placement of the filament 26 with respect to the spherical reflector 28 are two-fold. First, the illumination fall-off with radiation angle, $\alpha$, remains symmetrical over both the top and bottom halves of the reflector 28. Second, and more important, the separation of the focal planes of the filament 26 and the filament image 34 causes more of the filament image 34 to become visible as the radiation angle, $\alpha$, increases. This is the parallax referred to earlier and causes more light to be directed to the outer portions of the Fresnel lens 18, relative to the center illumination level of the Fresnel lens 18, than is obtained by the use of prior illumination systems.

Figure 5:
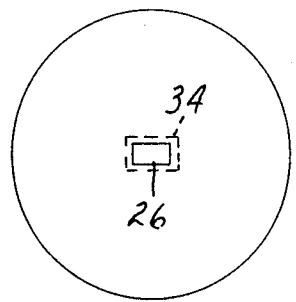
FIGS. 5, 6 and 7 illustrate the images of a filament and a filament image viewed at various angles in the exit pupil of a projection lens forming a portion of the overhead projector of FIG. 1.
Figure 7:
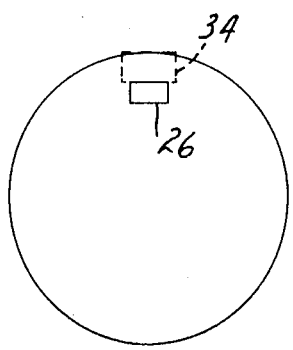
Figure 6:
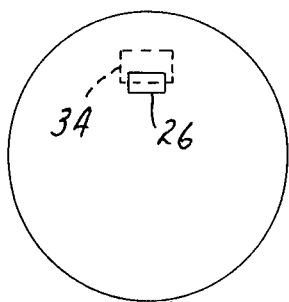

Ideally, a viewing of the filament 26 and the filament image 34 in the exit pupil of the projection head 22 should show the filament image 34 to be completely visible and just touching the actual filament 26 at the edge of the exit pupil of the projection head 22. FIGS. 5-7 show the images of the filament 26 and the filament image 34 formed by the Fresnel lens 18 as viewed in the exit pupil of the projection head 22 at an angle of 0° (on axis, FIG. 5), at an angle between 0° and the reflector rim angle $\theta$ (FIG. 6), and at the reflector rim angle $\theta$ (FIG. 7).

As shown in FIG. 5, the slight magnification of the filament image 34, nominally about 1.2×, gives some contribution of light from the filament image 34 along the optical axis, although most of the filament image 34 light is blocked. However, as off-axis viewing is increased, the filament image 34 becomes less obscured and contributes more to the screen illumination. Near the reflector rim angle, $\theta$, the filament image should contribute fully to screen illumination. If the separation between the filament 26 and the center of curvature 36 of the reflector 28 is chosen too small, there will be partial blockage of the filament image 34 near the edge of the exit pupil of the projection head 22 and if the separation is too large, the filament image 34 would have passed beyond the exit pupil of the projection head 22 near the rim angle $\theta$, both of which conditions are undesirable.

In the region near the rim angle $\theta$ of the reflector 28, every light ray from the actual filament 26 must contribute to the filament image 34, in other words, the filament image should be completely visible. To ensure this condition for a spherical reflector 28, the reflector rim angle $\theta$ must exceed a minimum value. Expressed in another way, the ratio R divided by $\phi$ of the reflector 28 should not exceed a value of about 0.56.

EXAMPLE

As a specific example of the improvement in illumination level and uniformity achievable in the present invention, measurements were taken of screen lumens and screen corner-to-center ratios at 0.73 and 0.96 of full-field. A spherical concave reflector 28 having a radius of curvature R of 23.9 mm, an aperture $\phi$ of 44.0 mm, and a rim angle $\theta$ of 67° was used in conjunction with an FNT-type 24 volt, 275 watt lamp. Nominal filament 26 dimensions for this lamp are about 3.5 mm high by 7.0 mm wide, giving a half-diagonal height H of about 4 mm. The glass condenser 30 had a focal length of 44.3 mm, and was a plano-aspheric type with the aspheric surface being close to parabolic. This lens 30 is spaced 9 mm from the lamp filament 26. A 182.5 mm focal length Fresnel lens 18 doublet and an A4 format (285 by 285 mm) stage were used with a 355 mm focal length spaced doublet projection lens operating at 5.35× magnification.

Table 1 shows measured screen lumens and screen uniformity as a function of the distance of the lamp filament inside the reflector center of curvature $\delta$. The values in parentheses represent a near-optimum value of $\delta$, at which both screen lumens and the corner-to-center illumination ratio of 0.96 field are maximized. This $\delta$-value is close to that predicted by use of Equation 6. Thus the efficiency of this illumination system is such that it is possible to achieve over 2000 screen lumens with a 275 watt lamp. The level of illumination is also increased significantly near the edges and corners of the screen, yielding improved corner-to-center ratios over previous overhead projector systems.

TABLE 1

| $\delta$ (mm) | Screen Lumens | Average Corner-/Center Ratio (0.73 Field) | Average Corner-/Center Ratio (0.96 Field) |
| --- | --- | --- | --- |
| 0 | 2024 | 0.36 | 0.24 |
| 1.0 | 2157 | 0.40 | 0.27 |
| (2.0) | (2388) | (0.47) | (0.30) |
| 3.0 | 2582 | 0.49 | 0.27 |

What is claimed is:

1. An illumination system for an overhead projector comprising a truncated concave reflector, an incandescent filament and a condenser lens, all axially aligned along a common optical axis and disposed such that said filament is between said concave reflector and said condenser lens and an image of said filament is focused on said optical axis and between said filament and said condenser lens.

2. An illumination system according to claim 1 wherein said condenser lens is a plano-convex glass lens.

3. An illumination system according to claim 1 wherein said filament is tightly wound.

4. An illumination system according to claim 1 wherein said concave reflector is spherical.

5. An illumination system according to claim 4 wherein said filament is between the center of curvature of said spherical reflector and said spherical reflector.

6. An illumination system for an overhead projector comprising a truncated spherical reflector, an incandescent filament and a condenser lens, all axially aligned along a common optical axis and disposed such that said filament is between said spherical reflector and said condenser lens and an image of said filament is focused on said optical axis and between the center of curvature of said spherical reflector and said condenser lens.

* * * * *